US012761419B2

(12) United States Patent
Ertsgaard

(10) Patent No.: US 12,761,419 B2
(45) Date of Patent: Oct. 13, 2026

(54) WAVEGUIDE WITH PERIODIC INDEX OF REFRACTION CLADDING

(71) Applicant: Quantinuum LLC, Broomfield, CO (US)

(72) Inventor: Christopher Ertsgaard, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 492 days.

(21) Appl. No.: 18/193,994

(22) Filed: Mar. 31, 2023

(65) Prior Publication Data

US 2024/0151901 A1 May 9, 2024

Related U.S. Application Data

(60) Provisional application No. 63/364,812, filed on May 17, 2022.

(51) Int. Cl.
*G02B 6/122* (2006.01)
*G02B 6/13* (2006.01)

(52) U.S. Cl.
CPC ............... *G02B 6/122* (2013.01); *G02B 6/13* (2013.01)

(58) Field of Classification Search
CPC ............................ G02B 6/02076; G02B 6/023
See application file for complete search history.

(56) References Cited

U.S. PATENT DOCUMENTS 5,455,883 A * 10/1995 Shigeta .................. G02F 1/135 385/129
2006/0088265 A1 4/2006 Akiyama et al.
2007/0122097 A1 5/2007 Schmidt et al.
2008/0141724 A1 6/2008 Fuflyigin
2011/0033162 A1 2/2011 Simonneau et al.
2013/0034322 A1* 2/2013 Auth .................... G02B 6/0286 385/124
2018/0081206 A1* 3/2018 Puckett .................. G02B 6/132

FOREIGN PATENT DOCUMENTS

JP H06-088968 A 3/1994

OTHER PUBLICATIONS

Byrnes, Steven J., "Multilayer Optical Calculations", submitted Mar. 6, 2016 to Cornell University Library Online Archive retrieved from the Internet at https://arxiv.org/pdf/1603.02720v1.pdf on Feb. 27, 2024, 21 pages.
Outgoing—ISA/210—International Search Report Mailed on Sep. 4, 2023 for WO Application No. PCT/US23/022330, 5 page(s).

(Continued)

*Primary Examiner* — Chad H Smith
(74) *Attorney, Agent, or Firm* — Alston & Bird LLP

(57) ABSTRACT

Various embodiments provide a waveguide with reduced optical power loss. The waveguide comprises a waveguide core having a core index of refraction; and a cladding disposed about at least a portion of a perimeter of the waveguide core. The cladding includes a plurality of layers that define a periodic index of refraction. The plurality of layers includes a core-adjacent layer having a core-adjacent layer index of refraction. The core index of refraction is greater than the core-adjacent layer index of refraction.

19 Claims, 6 Drawing Sheets

(56) References Cited

OTHER PUBLICATIONS

Figure 1:
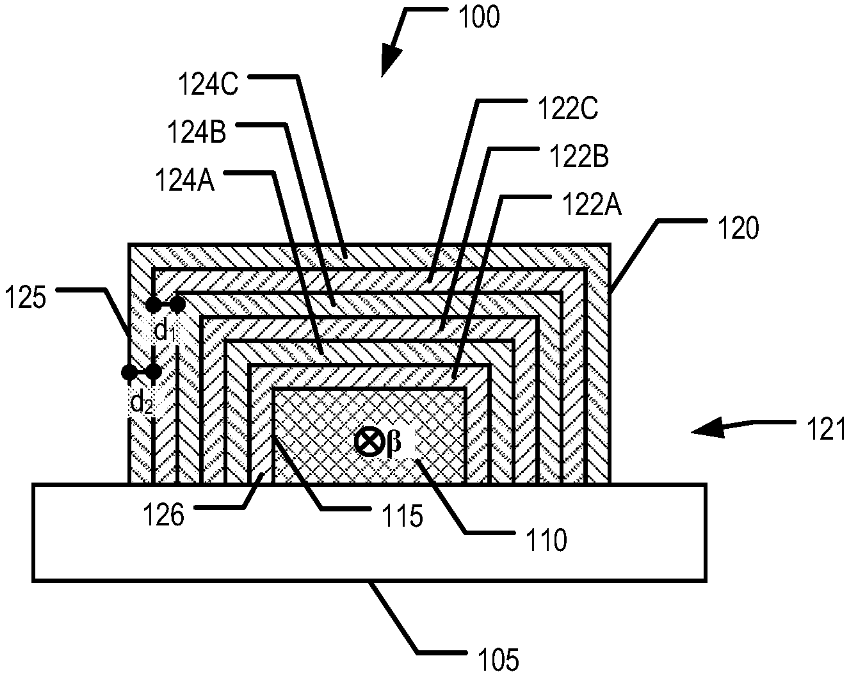

Outgoing Written Opinion of the ISA Mailed on Sep. 4, 2023 for WO Application No. PCT/US23/022330, 4 page(s).
English Translation of JP Office Action dated Nov. 25, 2025 for JP Application No. 2024568362, 3 page(s).
JP Office Action Mailed on Nov. 25, 2025 for JP Application No. 2024568362, 3 page(s).
English Translation of JP Office Action dated Apr. 21, 2026 for JP Application No. 2024568362, 4 page(s).
JP Office Action Mailed on Apr. 21, 2026 for JP Application No. 2024568362, 4 page(s).

* cited by examiner

WAVEGUIDE WITH PERIODIC INDEX OF REFRACTION CLADDING

CROSS-REFERENCE TO RELATED APPLICATIONS

This application claims priority to U.S. Application No. 63/364,812, filed May 17, 2022, the content of which is incorporated by reference herein in its entirety.

TECHNICAL FIELD

Various embodiments relate to a waveguide having reduced optical loss (compared to conventional waveguides). For example, various embodiments relate to a waveguide having a Bragg grating cladding.

BACKGROUND

Waveguides are used to direct optical signals from an optical source (e.g., a laser) to a target location. However, optical power loss as an optical signal propagates through waveguide can reduce the ability of the waveguide to provide a the optical signal. Through applied effort, ingenuity, and innovation many deficiencies of such waveguides have been solved by developing solutions that are structured in accordance with the embodiments of the present invention, many examples of which are described in detail herein.

BRIEF SUMMARY OF EXAMPLE EMBODIMENTS

Example embodiments provide waveguides that have a periodic index of refraction cladding, where the index of refraction of the waveguide core is greater than the index of refraction of the core-adjacent layer of the periodic index of refraction cladding. Example embodiments provide waveguides that have a cladding formed of alternating layers of material that have lower indexes of refraction than the waveguide core. Various embodiments provide a waveguide having a distributed Bragg grating cladding around at least a portion of the waveguide core. Various embodiments provide methods for fabricating such a waveguide.

According to one aspect of the present disclosure, a waveguide that has reduced optical power loss properties is provided. In an example embodiment, the waveguide comprises a waveguide core having a core index of refraction; and a cladding disposed about at least a portion of a perimeter of the waveguide core. The cladding comprises a plurality of layers that define a periodic index of refraction. The plurality of layers comprises a core-adjacent layer that has a core-adjacent layer index of refraction. The core index of refraction is greater than the core-adjacent layer index of refraction.

In an example embodiment, the cladding defines a rejection zone within which light of a target wavelength or light within a target wavelength range has a reduced probability of scattering into the cladding.

In an example embodiment, the cladding has a thickness of 2 microns or less.

In an example embodiment, the plurality of layers comprises a plurality of sets of layers, each set of layers of the plurality of sets of layers comprising at least a first cladding layer and a second cladding layer, the first cladding layer having a first layer index of refraction and the second cladding layer having a second layer index of refraction, the core index of refraction being greater than at least one of the first layer index of refraction or the second layer index of refraction.

In an example embodiment, a depth of each second cladding layer is in a range between 25 nm and 120 nm and a depth of each first cladding layer is in a range between 25 nm and 120 nm.

In an example embodiment, the plurality of sets of layers comprises 3 to 15 sets of layers, each set of layers comprising at least one first cladding layer and one second cladding layer.

In an example embodiment, the first layer index of refraction and the second layer index of refraction are different from one another.

In an example embodiment, the first cladding layer of a first set of layers is disposed immediately adjacent to the waveguide core and the second layer index of refraction is greater than the first layer index of refraction.

In an example embodiment, at least one of the first cladding layers or the second cladding layers comprise at least one of $SiO_2$, TEOS $SiO_2$, vacuum, air, $Al_2O_3$, $Si_3N_4$, Si, $TiO_2$, or $HfO_2$.

In an example embodiment, the cladding is a distributed Bragg grating cladding.

In an example embodiment, the waveguide core comprises one or more of $Al_2O_3$, $Si_3N_4$, Si, $TiO_2$, or $HfO_2$.

In an example embodiment, the waveguide core is formed on a substrate.

According to another aspect of the present disclosure, a method for fabricating a waveguide is provided. In an example embodiment, the method comprises forming a waveguide core, the waveguide core having a core index of refraction; and forming a cladding around at least a portion of the waveguide core. The cladding comprises a plurality of layers that define a periodic index of refraction. The plurality of layers comprises a core-adjacent layer that has a core-adjacent layer index of refraction. The core index of refraction is greater than the core-adjacent layer index of refraction.

In an example embodiment, the method further comprises, before forming the cladding, performing a smoothing operation on one or more surfaces of the waveguide core.

In an example embodiment, forming the waveguide core comprises depositing waveguide core material on a substrate using at least one of atomic layer deposition, chemical vapor deposition, or dielectric sputtering or evaporation.

In an example embodiment, forming the waveguide core further comprises patterning the waveguide core from the waveguide core material using one of (a) photolithography or electron-beam (ebeam) photolithography, followed by a dielectric etch, or (b) a photoresist followed by a plasma enhanced chemical vapor deposition or evaporation of a waveguide layer formed of the waveguide core material followed by a lift-off.

In an example embodiment, the method further comprises performing a reflow process of the photoresist before the dielectric etch or the lift-off to reduce roughness of sidewalls of the waveguide core.

In an example embodiment, forming the cladding comprises sequentially depositing at least first cladding layers and second cladding layers around at least a portion of the waveguide core to form a plurality of sets of cladding layers at least partially around the waveguide core.

In an example embodiment, the first cladding layers and second cladding layers are sequentially formed using at least one of atomic layer deposition or chemical vapor deposition.

In an example embodiment, the first cladding layers and the second cladding layers are formed via conformal deposition.

In an example embodiment, the first cladding layers are characterized by a first layer index of refraction, the second cladding layers are characterized by a second layer index of refraction, and the first layer index of refraction and the second layer index of refraction are different from one another.

In an example embodiment, the method further comprises performing chemical-mechanical polishing of an outer surface of the cladding.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates a cross-section view of a waveguide comprising a distributed Bragg grating cladding, in accordance with an example embodiment.

Figure 2A:
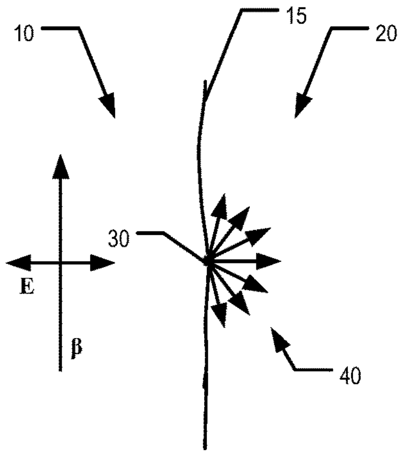
FIG. 2A (Prior Art)

FIG. 2A provides a perspective view of an example interface between a waveguide core and a conventional waveguide cladding.

Figure 2B:
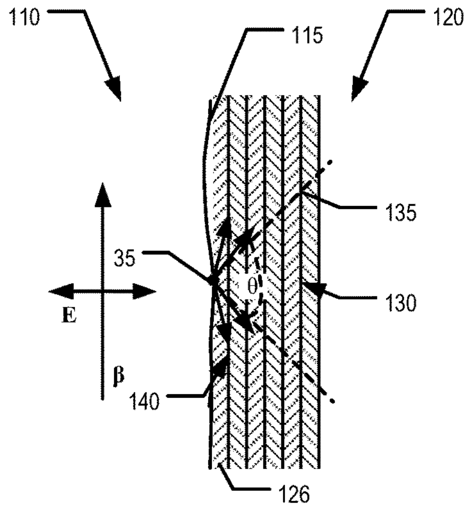

FIG. 2B provides a perspective view of an example interface between a waveguide core and a distributed Bragg grating cladding, in accordance with an example embodiment.

Figure 3:
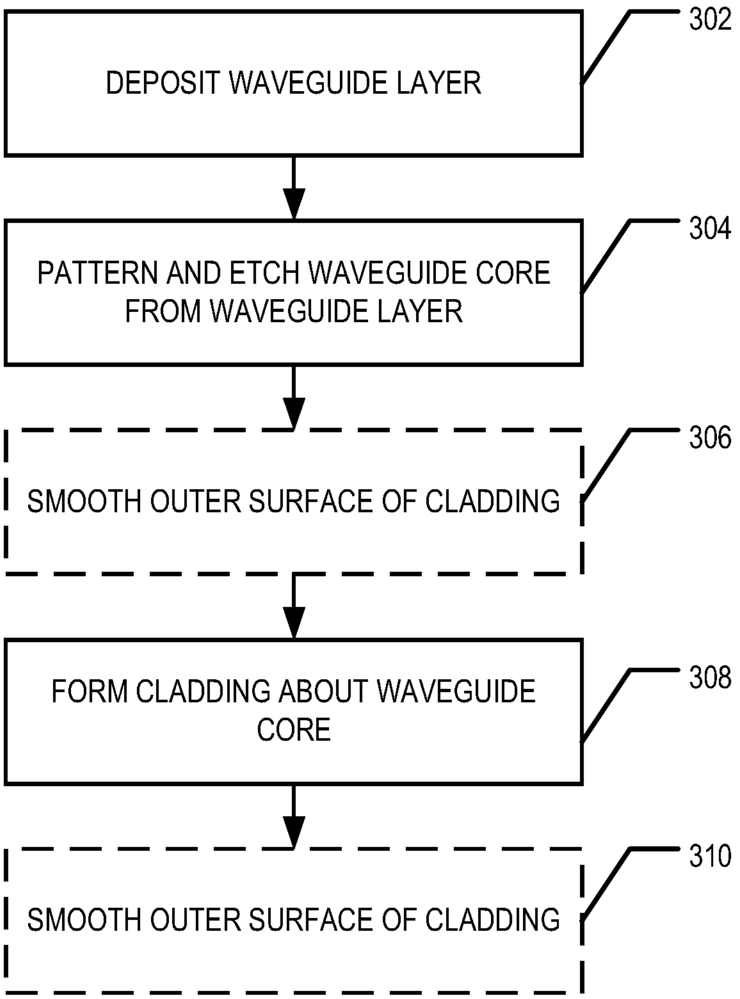

FIG. 3 provides a flowchart illustrating various processes, procedures, and/or operations for fabricating a waveguide with a distributed Bragg grating cladding, in accordance with an example embodiment.

Figure 4:
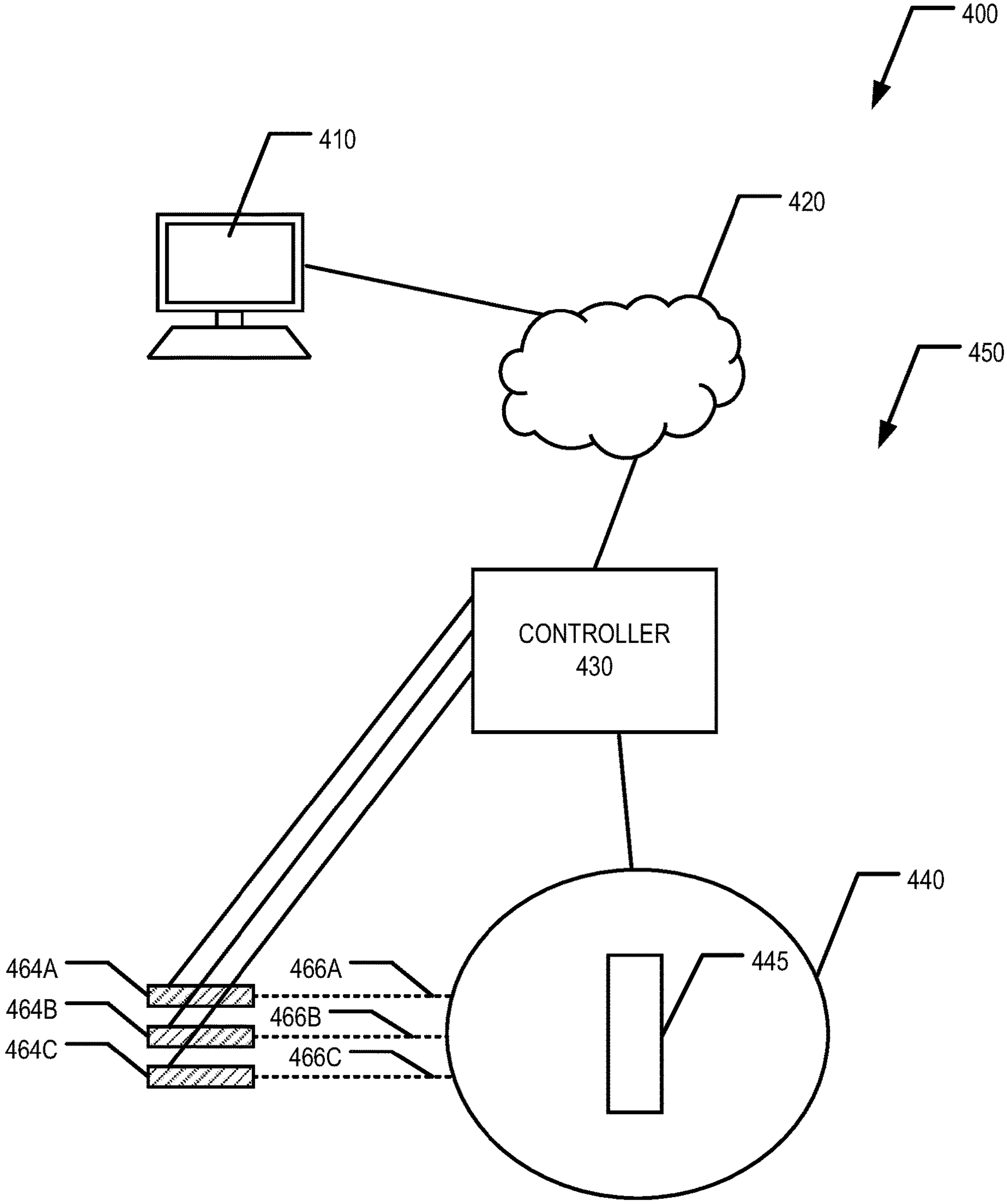

FIG. 4 provides a block diagram of an example trapped ion quantum computer comprising an integrated passive/active modulator unit of an example embodiment.

Figure 5:
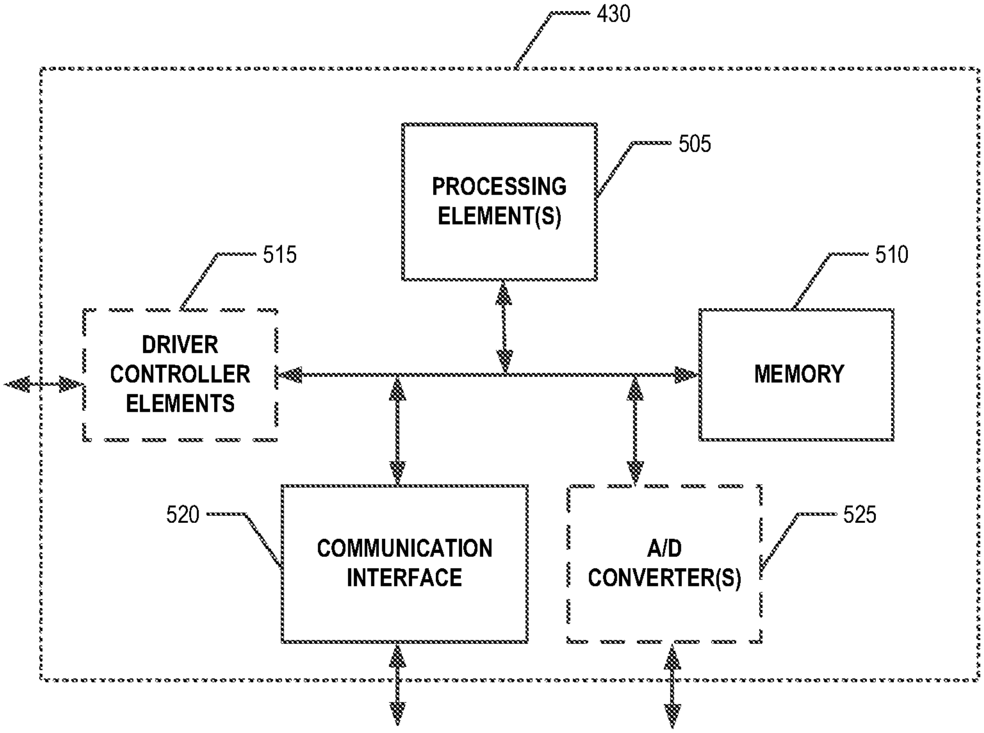

FIG. 5 provides a schematic diagram of an example controller of a quantum computer comprising an ion trap apparatus, in accordance with an example embodiment.

Figure 6:
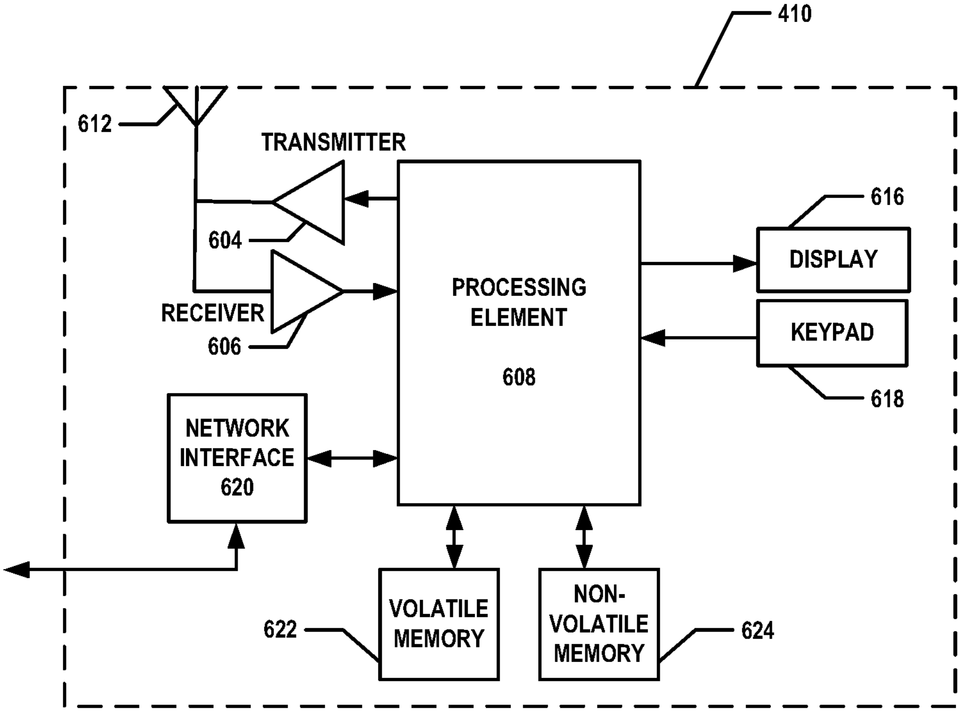

FIG. 6 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term “or” (also denoted “/”) is used herein in both the alternative and conjunctive sense, unless otherwise indicated. The terms “illustrative” and “exemplary” are used to be examples with no indication of quality level. The terms “generally,” “substantially,” and “approximately” refer to within engineering and/or manufacturing limits and/or within user measurement capabilities, unless otherwise indicated. Like numbers refer to like elements throughout.

In various scenarios, optical signals are provided through waveguides. The roughness of a surface of the waveguide can cause scattering events to occur, resulting in loss of optical power from the waveguide as the optical signal traverses the waveguide. Various embodiments provide waveguides with reduced optical power loss and methods of fabricating such waveguides. In various embodiments, the optical power loss of the waveguide is reduced through the use of a cladding around at least a portion of the waveguide that has a modulated and/or periodic index of refraction. In various embodiments, the modulated and/or periodic index of refraction of the cladding defines a rejection zone within which the transmission of light scattered from the optical signal due to an optical signal propagating through the waveguide core interacting with the non-smooth walls of the waveguide core is prevented and/or minimized. Thus, the overall optical power loss of an optical signal propagating along the waveguide is reduced.

Example Waveguide Having a Periodic Index of Refraction Cladding

FIG. 1 illustrates a cross-sectional view of an example waveguide 100 in accordance with an example embodiment. The cross-section of the waveguide 100 is taken in a plane substantially perpendicular to the guided propagation direction $\beta$ of the waveguide 100. In various embodiments, the waveguide 100 comprises a waveguide core 110 and a cladding 120 disposed at least partially around the waveguide core 110. In an example embodiment, the waveguide core 110 and the cladding 120 are formed on a substrate 105.

In various embodiments, the waveguide core 110 is made of and/or comprises a material having a core index of refraction. For example, in various embodiments, the waveguide core 110 comprises one or more of $Al_2O_3$, $Si_3N_4$, Si (e.g., amorphous Si, polysilicon, and/or the like), $TiO_2$, or $HfO_2$.

In various embodiments, the cladding 120 is characterized, at least in part, by a modulated or periodic index of refraction. For example, the index of refraction of the cladding 120 is not constant throughout the cladding. Rather, along a path having a consistent direction pointing outward from the surface of the waveguide core 110 toward the surrounding environment, the index of refraction of the cladding 120 is modulated and/or periodic. As used herein a periodic index of refraction means that while traversing a path outward from the surface of the waveguide core 110 (e.g., from sidewall 115) to the surrounding environment through the cladding 120, the index of refraction of the cladding 120 is non-constant in a periodic and/or repeating manner. For example, in various embodiments, the index of refraction is a step function that sequentially alternates through a set of values. The index of refraction of the portion of the cladding that interfaces with and/or is directly/immediately adjacent to the waveguide core is less than the core index of refraction.

In various embodiments, the cladding 120 comprises a plurality of layers. The innermost layer (e.g., the layer that interfaces with and/or is directly/immediately adjacent to the waveguide core 110) is referred to herein as the core-adjacent layer 126. The index of refraction of the core-adjacent layer 126 is referred to herein as the core-adjacent layer index of refraction. In various embodiments, the core-adjacent layer index of refraction is less than the core index of refraction. In various embodiments, the respective indexes of refraction of the remaining layers of the plurality of layers (e.g., the layers of the plurality of layers other than the core-adjacent layer) are less than or equal to the core index of refraction. In various embodiments, the respective indexes of refraction of the remaining layers of the plurality of layers (e.g., the layers of the plurality of layers other than the core-adjacent layer) are less than the core index of refraction. In an example embodiment, at least one of the plurality of layers other than the core-adjacent layer has an index of refraction that is larger than the core index of refraction.

In various embodiments, the cladding 120 comprises a plurality of sets of layers, where each set of layers comprises at least two layers. For example, in various embodiments, the cladding 120 comprises alternating first cladding layers 122 (e.g., 122A, 122B, 122C) and second cladding layers 124 (e.g., 124A, 124B, 124C). The index of refraction of the first cladding layer 122 is different from the index of refraction of the second cladding layer 124. In various embodiments, the cladding 120 comprises alternating first cladding layers, second cladding layers, and third cladding layers. In various embodiments, each set of layers comprises four or more layers. In various embodiments, the cladding 120 comprises sets of layers that form a distributed Bragg grating. For example, the grating formed by the modulation and/or sequential alternating of the index of refraction caused by the plurality of sets of layers that make up the cladding 120 satisfies the Bragg condition.

In an example embodiment, the first cladding layers 122 are made of and/or comprise a material having a first layer index of refraction and the second cladding layers 124 are made of and/or comprise a material having a second layer index of refraction. In an example embodiment, the core-adjacent layer 126 is the innermost first cladding layer 122A. For example, in an example embodiment, the core-adjacent layer index of refraction is the first layer index of refraction. In various embodiments, the core index of refraction is greater than the first layer index of refraction. In various embodiments, the core index of refraction is greater than or equal to the second layer index of refraction. In an example embodiment, the second index of refraction is greater than the core index of refraction. If the sets of layers include a third or further layer(s), the index of refraction of the third or further layer(s) may be less than, equal to, or greater than the core index of refraction, in various embodiments. In an example embodiment, the first layer index of refraction (e.g., the core-adjacent layer index of refraction) is less than the second layer index of refraction (and less than the core index of refraction). In an example embodiment, the second layer index of refraction is less than the first layer index of refraction.

In various embodiments, first cladding layers 122 and/or the second cladding layers 124 (and/or the third cladding and/or further cladding layer(s)) comprise one or more of $SiO_2$, tetraethyl orthosilicate (TEOS) $SiO_2$, vacuum, air, and/or the like. In an example embodiment, the first cladding layers 122 and/or the second cladding layers 124 comprise the same material as the waveguide core 110. In an example embodiment, the second cladding layers 124 comprise one or more of $Al_2O_3$, $Si_3N_4$, Si (e.g., amorphous Si, polysilicon, and/or the like), $TiO_2$, or $HfO_2$.

In the illustrated embodiment, the first cladding layers 122 have a first depth $d_1$. In an example embodiment, each of the first cladding layers 122 (e.g., the first layer of each of the plurality of sets of layers) has the same first depth $d_1$. In various embodiments, the first depth $d_1$ is less than or equal to the coherence length of the light to be transmitted through the waveguide 100 in the material of the first cladding layers 122. For example, the first depth $d_1$ may be dependent on the wavelength of light to be transmitted through the waveguide 100. In an example embodiment, one or more of the first cladding layers 122 (e.g., the first layer of at least one of the plurality of sets of layers) has different first depth $d_1$ from one of the other first cladding layers 122. In various embodiments, each first depth is in the range of 10 nm to 500 nm. For example, in an example embodiment, each first depth is in the range of 25 nm to 120 nm.

In the illustrated embodiment, the second cladding layers 124 have a second depth $d_2$. In an example embodiment, each of the second cladding layers 124 (e.g., the second layer of each of the plurality of sets of layers) has the same second depth $d_2$. In various embodiments, the second depth $d_2$ is less than or equal to the coherence length of the light to be transmitted through the waveguide 100 in the material of the second cladding layers 124. For example, the second depth $d_2$ may be dependent on the wavelength of light to be transmitted through the waveguide 100. In an example embodiment, one or more of the second cladding layers 124 (e.g., the second layer of at least one of the plurality of sets of layers) has different second depth $d_2$ from one of the other second cladding layers 124. In various embodiments, each second depth is in the range of 10 nm to 500 nm. For example, in an example embodiment, each second depth is in the range of 25 nm to 120 nm.

In various embodiments, the cladding 120 is made of a plurality of sets of layers 121. For example, in the illustrated embodiment, first cladding layer 122A and second cladding layer 124A form a first set of layers, first cladding layer 122B and second cladding layer 124B form a second set of layers, and first cladding layer 122C and second cladding layer 124C form a third set of layers. In various embodiments, the cladding 120 comprises 2 to 20 sets of layers. In various embodiments, the cladding 120 comprises 3 to 15 sets of layers. While the illustrated sets of layers include two layers (e.g., a first cladding layer 122 and a second cladding layer 124), in various embodiments, a set of layers may include three layers, four layers, five layers, six layers, and/or the like, as appropriate for the application.

In various embodiments, the cladding 120 has a thickness that is less than three microns. For example, in an example embodiment, the cladding 120 has a thickness that is two microns or less. In various embodiments, the thickness of the cladding is the composite thickness of the plurality of sets of layers 121. For example, the thickness of the cladding 120 is equal to the sum of each of the first depths $d_1$ of the respective first cladding layers 122 and each of the second depths $d_2$ of the respective second cladding layers 124, in a case where each set of layers consists of a first cladding layer 122 and a second cladding layer 124. For example, in an example embodiment, where each first layer has the same first depth $d_1$ and each second layer has the same second depth $d_2$, the thickness of the cladding is equal to $s(d_1+d_2)$, where s is an integer indicating the number of sets of layers.

In an example embodiment, the thickness of the periodic layers (e.g., $d_1$ and $d_2$) may change as a function of where the layer is located with respect to the waveguide core 110. For example, the thickness of the layers may taper up or taper down from the core-adjacent layer (e.g., the layer immediately/directly adjacent the waveguide core 110) to the exterior surface of the cladding 120 (that interfaces with the surrounding environment).

In various embodiments, one or more solitary and/or non-repeating layers may be inserted and/or disposed between the repeating sets of layers 121. For example, the solitary and/or non-repeating layer(s) may be used to define the rejection zone, make the rejection zone have a larger opening angle θ, and/or the like. For example, a solitary and/or non-repeating layer is a layer that is not a layer of the repeating sets of layers 121 that is included in the plurality of layers of the cladding 120. In an example embodiment, the core-adjacent layer is a solitary and/or non-repeating layer. In an example embodiment, the outermost layer of the plurality of layers of the cladding 120 is a solitary and/or non-repeating layer.

In various embodiments, an outer surface 125 of the cladding is smoothed using a chemical-mechanical polishing (CMP) process and/or the like.

In various embodiments, the modulated and/or periodic index of refraction of the cladding 120 causes the cladding to define a rejection zone within which light of a particular wavelength has a reduced probability of scattering into the cladding 120.

FIG. 2A illustrates a cross-section of a portion of a conventional waveguide having a waveguide core 10 and conventional cladding 20. The cross-section is taken in a plane that is substantially parallel to the guide propagation direction β of the waveguide. An optical beam propagating in the guided propagation direction β and having an electric field E that is transverse to the guided propagation vector β (e.g., transverse electric (TE) polarization) is illustrated as propagating along the waveguide core 10. In general, as a result of a process used to form the waveguide core 10, the sidewall 15 of the waveguide core 10 is not smooth. Thus, when the optical signal interacts with the sidewall 15, a scattering event 30 occurs. As a result of the scattering event 30, some of the optical signal is lost into the conventional cladding 20 as scattered signal 40. For a conventional cladding 20, the scattered signal 40 may be dispersed through the conventional cladding 20 at any angle. This results in significant optical losses due to various scattering events 30 as the optical signal propagates along the length of the conventional waveguide.

FIG. 2B illustrates a cross-section of a portion of a waveguide 100 having waveguide core 110 and the modulated and/or periodic index of refraction cladding 120. The cross-section is taken in a plane that is substantially parallel to the guide propagation direction β of the waveguide. An optical beam propagating in the guided propagation direction β and having an electric field E that is transverse to the guided propagation vector β (e.g., transverse electric (TE) polarization) is illustrated as propagating along the waveguide core 110. In general, as a result of a process used to form the waveguide core 110, the sidewall 115 of the waveguide core 110 is not smooth. Thus, when the optical signal interacts with the sidewall 115, a scattering event 35 may occur. However, the modulated and/or periodic index of refraction of the cladding 120 defines a rejection zone 130. Such that the scattered signal 140 is not dispersed into the rejection zone 130. In various embodiments, the rejection zone 130 is defined by rejection cone 135 having a vertex located at the location of the scattering event 35 and an opening angle θ.

In various embodiments, the first depth $d_1$ of the first cladding layers 122, the first refractive index of the first cladding layers 122 (e.g., the core-adjacent layer index of refraction), the second depth $d_2$ of the second cladding layers 124, the second refractive index of the second cladding layers 124, the depth and/or refractive index of any third or further layers, and/or the like are configured such that for a target wavelength or a wavelength within a target wavelength range, constructive or destructive interference of transmitted and reflected modes causes the scattered signal 140 to not propagate into the rejection zone.

In various embodiments, the first depth $d_1$ of the first cladding layers 122, the first refractive index of the first cladding layers 122 (e.g., the core-adjacent layer index of refraction), the second depth $d_2$ of the second cladding layers 124, the second refractive index of the second cladding layers 124, the depth and/or refractive index of any third or further layers, and/or the like are configured such that for the target wavelength or a wavelength within a target wavelength range and a range of angles of incidence of the optical signal with the sidewall 115, constructive or destructive interference of transmitted and reflected modes causes the scattered signal 140 to not propagate into the rejection zone.

In an example embodiment, the first depth $d_1$ of the first cladding layers 122, the first refractive index of the first cladding layers 122 (e.g., the core-adjacent layer index of refraction), the second depth $d_2$ of the second cladding layers 124, the second refractive index of the second cladding layers 124, the depth and/or refractive index of any third or further layers, and/or the like are configured such that for the target wavelength or a wavelength within a target wavelength range, the transmission of optical signal into the cladding is minimized for a wide range of angles of incidence of the optical signal with the sidewall 115.

As the scattered signal 140 is prevented from propagating through the rejection zone 130 and/or minimized within the rejection zone 130, the optical loss corresponding to the scattered signal is significantly reduced with respect to the scattered signal 40 of a similar scattering event within a waveguide with a conventional cladding 20. Thus, the waveguide 100 having modulated and/or periodic index of refraction cladding 120 provides an improvement to the fields of waveguides, low and/or reduced optical power loss waveguides, waveguide cladding, and/or similar technical fields.

Example Fabrication of a Waveguide Having a Periodic Index of Refraction Cladding FIG. 3 illustrates a flowchart illustrating various processes, procedures, operations, and/or the like for fabricating a waveguide 100 having modulated and/or periodic index of refraction, in accordance with an example embodiment. Starting at step/operation 302, a waveguide layer is deposited on a substrate 105. For example, a layer of material that is to be used to form the waveguide core 110 is deposited on the substrate 105. In various embodiments, the waveguide layer is deposited on the substrate 105 using at least one of atomic layer deposition (e.g., plasma enhanced atomic layer deposition, thermal atomic layer deposition, and/or the like), chemical vapor deposition (e.g., plasma enhanced chemical vapor deposition, low pressure chemical vapor deposition, and/or the like), or dielectric sputtering or evaporation.

In various embodiments, the substrate 105 is made of and/or comprises Si or another substrate material appropriate for the application. In various embodiments, the waveguide layer is made of and/or comprises one or more of $Al_2O_3$, $Si_3N_4$, Si (e.g., amorphous Si, polysilicon, and/or the like), $TiO_2$, or $HfO_2$.

At step/operation 304, the waveguide core 110 is formed from the waveguide layer deposited onto the substrate 105. For example, the waveguide core 110 is formed by patterning the waveguide layer and performing an etch and/or lift-off. In various embodiments, the waveguide core 110 is formed from the waveguide layer using a photolithography or electron-beam (ebeam) photolithography process followed by a dielectric etch. In various embodiments, the waveguide core 110 is formed from the waveguide layer using a photoresist process followed by a chemical vapor deposition (e.g., plasma enhanced chemical vapor deposition, low pressure chemical deposition, and/or the like) or evaporation of the waveguide layer followed by a lift-off process. Various other techniques may be used to pattern and form the waveguide core 110 from the waveguide layer in various embodiments, as appropriate for the intended application and the waveguide design.

At step/operation 306, in an example embodiment, the outer surface of the waveguide core 110 (e.g., sidewall 115) is smoothed. For example, process may be performed to reduce the roughness of the sidewalls 115 (and/or portion thereof) of the waveguide core 110. For example, a reflow process may be performed before the dielectric etch or the lift-off process is performed to reduce the roughness of the sidewalls 115 of the waveguide core 110, in an example embodiment. In another example embodiment, a brief isotropic etch may be used on at least a portion of the sidewall 115 of the waveguide core 110 to reduce the roughness of the at least a portion of the sidewall 115. For example, the patterned waveguide core 110 could be briefly dipped in a wet etch to round off rough features of the sidewall 115. In still another example, the sidewalls 115 may be smooth by oxidizing at least a portion of the surface of the waveguide core 110 and then performing an oxidize etch.

At step/operation 308, the cladding 120 is formed around at least a portion of the waveguide core 110. In the embodiment illustrated in FIG. 1, the cladding 120 is around the three surfaces or sidewalls 115 of the waveguide core 110 that are not immediately adjacent and/or abutting the substrate 105.

In an example embodiment, the cladding 120 surrounds the waveguide core 110. For example, a plurality of layers of the cladding 120 may be disposed between the waveguide core 110 and the substrate 105. For example, a plurality of layers of the cladding 120 may be deposited onto the substrate prior to performing step/operation 302. The waveguide layer may then be deposited on the plurality of layers of the cladding 120. Additional layers of the cladding (e.g., to cover/enclose the sides and top of the waveguide core 110) may then be formed around the at least a portion of the waveguide core at step/operation 308.

In various embodiments, the cladding 120 is formed so as to have a modulated and/or periodic index of refraction. In various embodiments, forming the cladding 120 comprises sequentially depositing a plurality of sets of cladding layers around at least a portion of the waveguide core 110. For example, in an embodiment where a set of cladding layers consists of a first cladding layer and a second cladding layer, forming the cladding comprises depositing a first cladding layer 122A (e.g., the core-adjacent layer 126) at least partially about the waveguide core 110, then depositing a second cladding layer 124A on the exposed surface of the first cladding layer 122. Another first cladding layer 122B is then deposited on the second cladding layer 124A, followed by the deposition of another second cladding layer 124B on the first cladding layer 122B. The sequential alternating deposition of the cladding layers is sequentially performed until all of the plurality of sets of cladding layers are formed.

In various embodiments, the cladding layers (e.g., the first cladding layers 122 and/or second cladding layers 124) are sequentially formed using at least one of atomic layer deposition (e.g., plasma enhanced atomic layer deposition, thermal atomic layer deposition, and/or the like), chemical vapor deposition (e.g., plasma enhanced chemical vapor deposition, low pressure chemical vapor deposition, and/or the like).

In various embodiments, the cladding layers (e.g., the first cladding layers 122 and/or second cladding layers 124) are sequentially formed using a conformal deposition. For example, the first cladding layer 122A (e.g., the core-adjacent layer 126) deposited onto the waveguide core 110 may conform to the topology of the waveguide core 110 and the second cladding layer 124B deposited onto the first cladding layer 122A may conform to the topology of the first cladding layer 122A, and so on.

In various embodiments, the cladding layers of the plurality of sets of cladding layers 121 are sequentially formed such that the cladding 120 has a modulated and/or periodic index of refraction. In various embodiments, the cladding layers of the plurality of sets of cladding layers 121 are sequentially formed such that the plurality of sets of cladding layers forms a Bragg grating. As should be understood, a Bragg grating is a type of distributed Bragg reflector.

Continuing to step/operation 310 of FIG. 3, in an example embodiment, the outer surface 125 of the cladding 120 is smoothed. For example, a CMP or other surface smoothing process may be used to smooth and/or reduce the roughness of the outer surface 125 of the cladding 120.

In an example embodiment, the final cladding layer (e.g., second cladding layer 124C) may be deposited to have a greater depth than the other (similar) cladding layers. For example, second cladding layers 124A and 124B may have the same second depth $d_2$ and the final cladding layer 124C may have a larger second depth $d_2$ that the second cladding layers 124A and 124B. CMP may then be used to planarize the outer surface 125 of the cladding 120.

Exemplary Quantum Computer Comprising Waveguide with a Periodic Index of Refraction Cladding Waveguides are used in a variety of contexts. One example context is various quantum computing systems. One such example quantum computing system comprises a quantum charge-coupled device (QCCD)-based quantum computer. FIG. 4 provides a schematic diagram of an example quantum computer system 400 comprising at least one optical path 466 (466A, 466B, 466C) that is defined at least in part by a waveguide 100 having a periodic index of refraction cladding 120. In various embodiments, the quantum computer system 400 comprises a computing entity 410 and a quantum computer 450. In various embodiments, the quantum computer 450 comprises a controller 430, a cryogenic and/or vacuum chamber 440 enclosing an ion trap 445, and one or more manipulation sources 464 (e.g., 464A, 464B, 464C). In an example embodiment, the one or more manipulation sources 464 may comprise one or more lasers (e.g., UV lasers, visible lasers, microwave lasers, and/or the like). In various embodiments, the one or more manipulation sources 464 are configured to manipulate and/or cause a controlled quantum state evolution of one or more ions within the ion trap 445. For example, in an example embodiment, wherein the one or more manipulation sources 464 comprise one or more lasers, the lasers may provide one or more laser beams to the ion trap 445 within the cryogenic and/or vacuum chamber 440. The one or more manipulation sources 464 each provide a laser beam and/or the like to the ion trap 445 via a corresponding optical paths 466 (e.g., 466A, 466B, 466C). In various embodiments, at least one optical path 466 comprises a waveguide 100 comprising a modulated and/or periodic index of refraction cladding 120. Via the waveguide 100 a manipulation source 464 may provide a modulated beam, via an optical path 466, to the ion trap 445.

In various embodiments, a computing entity 410 is configured to allow a user to provide input to the quantum computer 450 (e.g., via a user interface of the computing entity 410) and receive, view, and/or the like output from the quantum computer 450. The computing entity 410 may be in communication with the controller 430 of the quantum computer 450 via one or more wired or wireless networks 420 and/or via direct wired and/or wireless communications.

In an example embodiment, the computing entity 410 may translate, configure, format, and/or the like information/data, quantum computing algorithms, and/or the like into a computing language, executable instructions, command sets, and/or the like that the controller 430 can understand and/or implement.

In various embodiments, the controller 430 is configured to control the electrical signal sources and/or drivers, cryogenic system and/or vacuum system controlling the temperature and pressure within the cryogenic and/or vacuum chamber 440, manipulation sources 464, and/or other systems controlling the environmental conditions (e.g., temperature, humidity, pressure, and/or the like) within the cryogenic and/or vacuum chamber 440 and/or configured to manipulate and/or cause a controlled evolution of quantum states of one or more ions within the ion trap 445. In various embodiments, the ions trapped within the ion trap 445 are used as qubits of the quantum computer 450.

Exemplary Controller

In various embodiments, a waveguide 100 having a modulated and/or periodic index of refraction cladding 120 is incorporated into a quantum computer 450. In various embodiments, a quantum computer 450 further comprises a controller 430 configured to control various elements of the quantum computer 450. For example, the controller 430 may be configured to control the voltage sources and/or drivers configured to provide electrical signal(s) to control the modulation of one or more beams via corresponding modulator(s), a cryogenic system and/or vacuum system controlling the temperature and pressure within the cryogenic and/or vacuum chamber 440, manipulation sources 464, and/or other systems controlling the environmental conditions (e.g., temperature, humidity, pressure, and/or the like) within the cryogenic and/or vacuum chamber 440 and/or configured to manipulate and/or cause a controlled evolution of quantum states of one or more ions within the ion trap 445.

As shown in FIG. 5, in various embodiments, the controller 430 may comprise various controller elements including processing elements 505, memory 510, driver controller elements 515, a communication interface 520, analog-digital converter elements 525, and/or the like. For example, the processing elements 505 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like, and/or controllers. The term circuitry may refer to an entirely hardware embodiment or a combination of hardware and computer program products. In an example embodiment, the processing element 505 of the controller 430 comprises a clock and/or is in communication with a clock.

For example, the memory 510 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 510 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language (s), and/or the like), and/or the like. In an example embodiment, execution of at least a portion of the computer program code stored in the memory 510 (e.g., by a processing element 505) causes the controller 430 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 515 may include one or more drivers and/or controller elements each configured to control one or more drivers. In various embodiments, the driver controller elements 515 may comprise drivers and/or driver controllers. For example, the driver controllers may be configured to cause one or more corresponding drivers to be operated in accordance with executable instructions, commands, and/or the like scheduled and executed by the controller 430 (e.g., by the processing element 505). In various embodiments, the driver controller elements 515 may enable the controller 430 to operate a manipulation source 464. In various embodiments, the drivers may be laser drivers; vacuum component drivers; drivers for controlling the flow of current and/or voltage of an electrical signal applied to electrodes of an ion trap 445; cryogenic and/or vacuum system component drivers; and/or the like. In various embodiments, the controller 430 comprises means for communicating and/or receiving signals from one or more optical receiver components such as cameras, MEMs cameras, CCD cameras, photodiodes, photomultiplier tubes, and/or the like. For example, the controller 430 may comprise one or more analog-digital converter elements 525 configured to receive signals from one or more optical receiver components, calibration sensors, and/or the like.

In various embodiments, the controller 430 may comprise a communication interface 520 for interfacing and/or communicating with a computing entity 410. For example, the controller 430 may comprise a communication interface 520 for receiving executable instructions, command sets, and/or the like from the computing entity 410 and providing output received from the quantum computer 450 (e.g., from an optical collection system) and/or the result of a processing the output to the computing entity 410. In various embodiments, the computing entity 410 and the controller 430 may communicate via a direct wired and/or wireless connection and/or one or more wired and/or wireless networks 420.

Exemplary Computing Entity

FIG. 6 provides an illustrative schematic representative of an example computing entity 410 that can be used in conjunction with embodiments of the present invention. In various embodiments, a computing entity 410 is configured to allow a user to provide input to the quantum computer 450 (e.g., via a user interface of the computing entity 410) and receive, display, analyze, and/or the like output from the quantum computer 450.

As shown in FIG. 6, a computing entity 410 can include an antenna 612, a transmitter 604 (e.g., radio), a receiver 606 (e.g., radio), and a processing element 608 that provides signals to and receives signals from the transmitter 604 and receiver 606, respectively. The signals provided to and received from the transmitter 604 and the receiver 606, respectively, may include signaling information/data in accordance with an air interface standard of applicable wireless systems to communicate with various entities, such as a controller 430, other computing entities 410, and/or the like. In this regard, the computing entity 410 may be capable of operating with one or more air interface standards, communication protocols, modulation types, and access types. For example, the computing entity 410 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 410 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 410 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 410 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 410 can also download changes, add-ons, and updates, for instance, to its firmware, software (e.g., including executable instructions, applications, program modules), and operating system. In various embodiments, the computing entity 410 includes a network interface 620 configured to communicate via one or more wired and/or wireless networks 420.

The computing entity 410 may also comprise a user interface device comprising one or more user input/output interfaces (e.g., a display 616 and/or speaker/speaker driver coupled to a processing element 608 and a touch screen, keyboard, mouse, and/or microphone coupled to a processing element 608). For instance, the user output interface may be configured to provide an application, browser, user interface, interface, dashboard, screen, webpage, page, and/or similar words used herein interchangeably executing on and/or accessible via the computing entity 410 to cause display or audible presentation of information/data and for interaction therewith via one or more user input interfaces. The user input interface can comprise any of a number of devices allowing the computing entity 410 to receive data, such as a keypad 618 (hard or soft), a touch display, voice/speech or motion interfaces, scanners, readers, or other input device. In embodiments including a keypad 618, the keypad 618 can include (or cause display of) the conventional numeric (0-9) and related keys (#, *), and other keys used for operating the computing entity 410 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 410 can collect information/data, user interaction/input, and/or the like.

The computing entity 410 can also include volatile storage or memory 622 and/or non-volatile storage or memory 624, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 410.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A waveguide comprising:

a waveguide core having a core index of refraction; and a cladding disposed about at least a portion of a perimeter of the waveguide core, the cladding comprising a plurality of layers that define a periodic index of refraction, wherein the plurality of layers comprises a plurality of sets of layers, each set of layers of the plurality of sets of layers comprising at least a first cladding layer and a second cladding layer such that the plurality of layers comprises first cladding layers and second cladding layers, the first cladding layers each have a first depth that is less than or equal to a coherence length of light to be transmitted through the waveguide in a material of the first cladding layers, and the second cladding layers each have a second depth that is less than or equal to a coherence length of light to be transmitted through the waveguide in a material of the second cladding layers, wherein the plurality of layers comprises a core-adjacent layer having a core-adjacent layer index of refraction, wherein the core index of refraction is greater than the core-adjacent layer index of refraction; and wherein the first cladding layers are characterized by a first layer index of refraction and the second cladding layer are characterized by a second layer index of refraction, and the core index of refraction is greater than the first layer index of refraction and less than or equal to the second layer index of refraction.

2. The waveguide of claim 1, wherein the cladding defines a rejection zone within which light of a target wavelength or light within a target wavelength range has a reduced probability of scattering into the cladding.

3. The waveguide of claim 1, wherein the cladding has a thickness of 2 microns or less.

4. The waveguide of claim 1, wherein a depth of each second cladding layer is in a range between 25 nm and 120 nm and a depth of each first cladding layer is in a range between 25 nm and 120 nm.

5. The waveguide of claim 1, wherein the plurality of sets of layers comprises 3 to 15 sets of layers, each set of layers comprising at least one first cladding layer and one second cladding layer.

6. The waveguide of claim 1, wherein the first layer index of refraction and the second layer index of refraction are different from one another and each set of layers comprises a third cladding layer.

7. The waveguide of claim 1, wherein at least one of the first cladding layers or the second cladding layers comprises $SiO_2$, TEOS $SiO_2$, vacuum, air, $Al_2O_3$, $Si_3N_4$, Si, $TiO_2$, or $HfO_2$.

8. The waveguide of claim 1, wherein the cladding is a distributed Bragg grating cladding.

9. The waveguide of claim 1, wherein the waveguide core comprises one or more of $Al_2O_3$, $Si_3N_4$, Si, $TiO_2$, or $HfO_2$.

10. The waveguide of claim 1, wherein the waveguide core is formed on a substrate.

11. A method for fabricating a waveguide, the method comprising:

forming a waveguide core from a waveguide core material, the waveguide core having a core index of refraction; and forming a cladding around at least a portion of the waveguide core, the cladding comprising a plurality of layers that define a periodic index of refraction, wherein the plurality of layers is formed to comprise a plurality of sets of layers, each set of layers of the plurality of sets of layers comprising at least a first cladding layer and a second cladding layer such that the plurality of layers comprises first cladding layers and second cladding layers, the first cladding layers each have a first depth that is less than or equal to a coherence length of light to be transmitted through the waveguide in a material of the first cladding layers, and the second cladding layers each have a second depth that is less than or equal to a coherence length of light to be transmitted through the waveguide in a material of the second cladding layers, wherein the plurality of layers comprises a core-adjacent layer having a core-adjacent layer index of refraction, wherein the core index of refraction is greater than the core-adjacent layer index of refraction; and wherein the first cladding layers are characterized by a first layer index of refraction and the second cladding layers are characterized by second layer index of refraction, and the core index of refraction is greater than the first layer index of refraction and less than or equal to the second layer index of refraction.

12. The method of claim 11, further comprising, before forming the cladding, performing a smoothing operation on one or more surfaces of the waveguide core.

13. The method of claim 11, wherein forming the waveguide core comprises depositing waveguide core material on a substrate using at least one of atomic layer deposition, chemical vapor deposition, or dielectric sputtering or evaporation.

14. The method of claim 13, wherein forming the waveguide core further comprises patterning the waveguide core from the waveguide core material using one of (a) photolithography or electron-beam photolithography, followed by a dielectric etch, or (b) a photoresist followed by a chemical vapor deposition or evaporation of a waveguide layer formed of the waveguide core material followed by a lift-off.

15. The method of claim 14, further comprising performing a reflow process of the photoresist before the dielectric etch or the lift-off reduce roughness of sidewalls of the waveguide core.

16. The method of claim 11, wherein forming the cladding comprises sequentially depositing at least the first cladding layers and the second cladding layers around at least the portion of the waveguide core to form the plurality of sets of layers at least partially around the waveguide core.

17. The method of claim 16, wherein the first cladding layers and the second cladding layers are sequentially formed using at least one of atomic layer deposition or chemical vapor deposition.

18. The method of claim 16, wherein the first cladding layers and the second cladding layers are formed via conformal deposition.

19. The method of claim 11, further comprising performing chemical-mechanical polishing of an outer surface of the cladding.

* * * * *